US008556051B2

(12) United States Patent
Guelluek et al.

(10) Patent No.: US 8,556,051 B2
(45) Date of Patent: Oct. 15, 2013

(54) CLUTCH ASSEMBLY AND FORCE TRANSMISSION DEVICE WITH A CLUTCH ASSEMBLY

(75) Inventors: Toros Guelluek, Lichtenau (DE); Thorsten Krause, Buehl (DE); Bruno Mueller, Sasbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 477 days.

(21) Appl. No.: 12/436,330

(22) Filed: May 6, 2009

(65) Prior Publication Data

US 2009/0223770 A1 Sep. 10, 2009

Related U.S. Application Data

(63) Continuation of application No. PCT/DE2007/001828, filed on Oct. 15, 2007.

(30) Foreign Application Priority Data

Nov. 6, 2006 (DE) .......................... 10 2006 052 145

(51) Int. Cl.
*F16H 45/02* (2006.01)
*F16D 13/72* (2006.01)

(52) U.S. Cl.
USPC ................... 192/3.29; 192/70.12; 192/113.36

(58) Field of Classification Search
USPC ........................................................ 192/3.25
See application file for complete search history.

(56) References Cited

U.S. PATENT DOCUMENTS

| 3,366,210 | A | * | 1/1968 | Webster ...................... 192/70.12 |
| 5,240,095 | A | * | 8/1993 | Shimamura et al. ........ 192/70.12 |
| 5,501,309 | A | * | 3/1996 | Walth et al. .................. 192/3.29 |
| 5,566,802 | A | | 10/1996 | Kirkwood |
| 5,671,835 | A | * | 9/1997 | Tanaka et al. ............. 192/113.36 |
| 6,213,273 | B1 | | 4/2001 | Menard et al. |
| 6,910,561 | B2 | * | 6/2005 | Sasse .......................... 192/70.12 |

(Continued)

FOREIGN PATENT DOCUMENTS

| DE | 196 22 593 C2 | 4/1997 |
| DE | 199 30 966 A1 | 1/2001 |

(Continued)

*Primary Examiner* — Rodney Bonck
(74) *Attorney, Agent, or Firm* — Simpson & Simpson, PLLC

(57) ABSTRACT

The invention relates to a clutch assembly, particularly for use in force transmission devices for motor vehicle, comprising a housing arrangement that is or can be filled with a fluid, and a frictional arrangement that has a first frictional surface arrangement and a second frictional surface arrangement which can be effectively interconnected by means of an actuator. Each frictional surface arrangement is provided with at least one frictional surface-supporting element. A fluid flow can be generated in the housing arrangement for cooling the frictional surface arrangements. The invention is characterized in that means are provided for creating at least one circuit which repeatedly flows through at least one frictional surface-supporting element of the frictional arrangement and conducts the fluid flow when the rotational speed differs between the effectively interconnectable frictional surface-supporting elements of the different frictional surface arrangements. Said means encompass cooling ducts which define the course of a single circuit in the direction of flow. The extension of the cooling ducts from an radially inward area to a radially outward area, or vice versa, in or on a frictional surface-supporting element in the desired direction of flow is characterized by a circumferential directional component in the direction of rotation of the individual frictional surface arrangement.

18 Claims, 8 Drawing Sheets

(56) References Cited

U.S. PATENT DOCUMENTS

| | | |
|---|---|---|
| 7,044,279 B2 * | 5/2006 | Leber .......................... 192/3.25 |
| 7,104,376 B2 * | 9/2006 | Sudau ........................ 192/70.12 |
| 2006/0163023 A1 * | 7/2006 | Sudau et al. ................ 192/113.3 |
| 2007/0000747 A1 * | 1/2007 | Miyazaki .................... 192/70.12 |
| 2007/0045074 A1 | 3/2007 | Karamavruc |

FOREIGN PATENT DOCUMENTS

| | | |
|---|---|---|
| DE | 103 50 935 A1 | 5/2004 |
| DE | 103 08 137 A1 | 9/2004 |
| DE | 10 2006 032 408 A1 | 2/2007 |
| EP | 1 464 857 A1 | 10/2004 |
| EP | 1 541 887 A1 | 6/2005 |

* cited by examiner

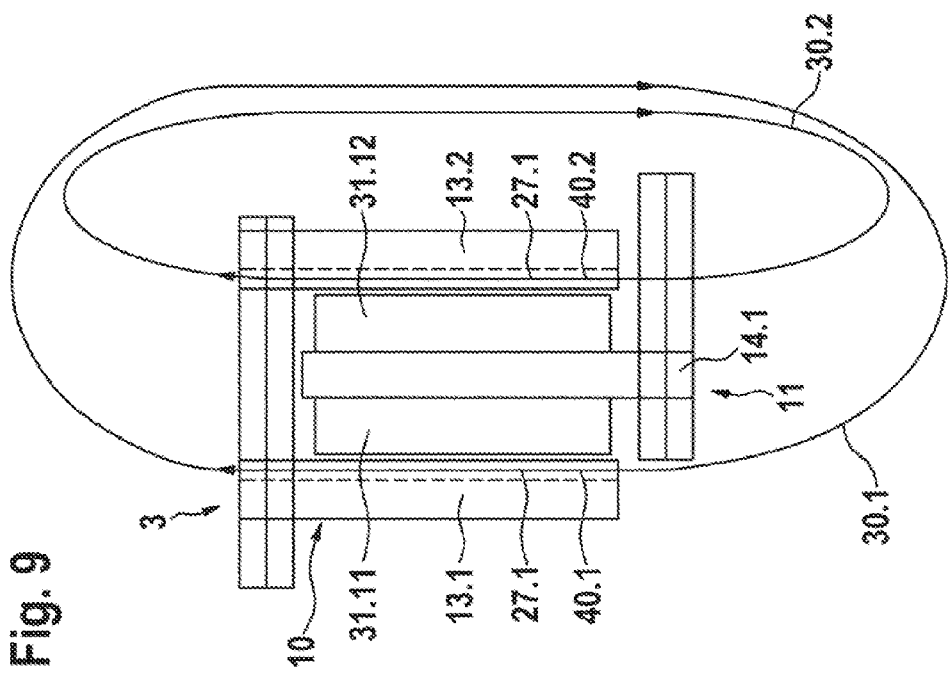

CLUTCH ASSEMBLY AND FORCE TRANSMISSION DEVICE WITH A CLUTCH ASSEMBLY

CROSS-REFERENCE TO RELATED APPLICATIONS

This application is filed under 35 U.S.C. §120 and §365(c) as a continuation of International Patent Application PCT/DE2007/001828, filed Oct. 15, 2007, which application claims priority from German Patent Application No. 10 2006 052 145.5, filed Nov. 6, 2006 which applications are incorporated herein by reference in their entirety.

FIELD OF THE INVENTION

The invention relates to a clutch assembly for use in a force transmission device, and it furthermore relates to a force transmission device.

BACKGROUND OF THE INVENTION

Clutch assemblies comprising a housing assembly, a friction assembly disposed in the housing assembly, which friction assembly comprises a first friction surface assembly and a second friction surface assembly which can be brought into operative engagement with one another through an actuation device, are known in a plurality of embodiments. Thus, the housing assembly is typically configured as a rotating housing assembly and coupled with an input of the clutch device or it forms said input, wherein the input can be coupled with a drive unit. The first friction surface assembly is connected torque proof to the input or to the housing assembly, while the second friction surface assembly is coupled torque proof with the output. The output is formed by a transmission component, typically by a transmission input shaft, when a force transmission device is connected in front. Such clutch assemblies can be used by themselves or they can also be used in so-called force transmission devices.

Reference is made to the printed documents DE 196 22 593 C2 and DE 103 08 137 A1 with respect to combinations of clutch assemblies with hydrodynamic components in force transmission devices. An embodiment in a twin clutch assembly is described e.g. in EP 1 541 887 A1. All clutch assemblies are friction clutches which can be operated with slippage.

The friction locking is thus implemented by friction surfaces, wherein at least one friction surface is configured as a friction liner. Said liner is often comprised of organic material. In particular, during slippage operation, such clutch assemblies are exposed to high thermal loads, and therefore have to be cooled well in order to prevent burning the mostly organic friction liners. Thus, depending on the embodiment of the clutch assembly, an open cooling with a cooling medium flowing through is selected. Said type of cooling is possible for all embodiments recited supra. When integrating such a clutch assembly in a force transmission device with a hydrodynamic component, an operating means from an external loop, which is associated with the hydrodynamic component, is thus used as coolant flow.

The printed document DE 196 22 593 C2 discloses an embodiment of the force transmission device comprising a hydrodynamic speed-/torque converter, and a clutch assembly associated with said force transmission unit, which clutch assembly is provided as a lockup clutch for torque proof connection between the input of the force transmission device and the output, in particular, for torque proof coupling between the pump shell and the turbine shell of the hydrodynamic speed-/torque converter. Depending on the embodiment of the force transmission device as a two- or three channel system, the actuation device for the clutch assembly can be controlled or adjusted by the pressure in the hydrodynamic component or through a separate additional pressure cavity, which controls the contact pressure force of the actuation device, irrespective of the pressure in the hydrodynamic component. In order to remove the heat, which is created during slipping operation of the clutch assembly, thus coolant, in particular the operating means of the hydrodynamic converter, is conducted through radially configured channels, which are configured in the components forming the friction surface. The channels provided in the area of the friction zone are thus configured, so that the flow of hydraulic fluid required for cooling, in particular the flow of converter fluid, is assured. Thus, a pressure opposed to the actuation device is generated between the elements of the friction liner assembly, which can be brought into operative engagement with one another, which pressure, however, is compensated in turn by a respective configuration of the piston element. Thus, the provided channels extend completely over the entire friction zone, which channels carry fluid in particular during lockup operation, which fluid exits in radially outward direction, this means, due to the centrifugal force through the intermediary space between the pump shell and the turbine shell from the hydrodynamic speed-/torque converter, and which is routed through the cooling channels (27.1, 27.2) in the clutch assembly. Said friction zone is configured, so that the flow velocity is reduced. The routing is thus performed over the entire friction surface in the portion of the inner circumference up to the outer circumference, and the coolant exits again at the respective inner- or outer circumference and is removed. Thus, the groove patterns of the elements bearing friction surfaces and disposed adjacent to one another are configured analogous to one another.

An embodiment also routing operating means of a hydrodynamic converter through the clutch assembly, in particular from the portion of the outer circumference to the inner circumference of the clutch assembly, is known from the printed document DE 103 50 935 A1. This document discloses a method and a device for dosing an oil flow. Herein, dosing the oil flow is performed through at least one friction surface of at least one friction surface bearing element configured as a disk of a friction surface assembly of a converter lockup clutch, wherein the oil flow through the pump shell and through the stator shell is restricted by measures in the space between the outside of the turbine shell and the inside of the converter, so that the oil flow over the at least one friction surface is increased. Also here, operating means is routed from the hydrodynamic speed-/torque converter through the clutch assembly. Thus, a flow is only performed in one direction, wherein the operating means flow is performed in lockup operation, this means with the clutch assembly actuated, through integrated coolant channels in particular friction surface bearing elements of the friction assembly of the clutch assembly, and the routing is performed from the outer circumference of the hydrodynamic speed-/torque converter and back to the same or through a separate cooling system. Thus, in this embodiment, a coolant flow is formed caused by the operation of the converter in lockup mode, which coolant flow through the clutch assembly is continuous during filling. Said coolant flow can also be conducted in a loop, wherein, however, the loop paths can be very long. The particular friction surface bearing elements are thus always flowed through substantially in the same direction, and thus cooled, so that the coolest portion is disposed in the portion of the outer circumference, while the portion at the inner circumference is always flowed through by coolant with increased temperature. Thus, for optimized cooling, the cooling power, and thus the flow-through, has to be increased.

Another cooling problem, when configuring the clutch assembly as a disk clutch in a twin clutch, is known from the printed document EP 1 541 887 A1. Here, two single clutch assemblies are provided, which are coupled with a drive respectively, and furthermore, their second friction surface assembly is can be respectively connected torque proof with an output. The cooling can be performed here as a closed cooling. In this case, the clutch assembly is constantly disposed in an oil torus. Due to the viscosity of said medium, besides the cooling problem, there are also problems when activating the clutch assembly or during disengaging due to the viscosity of the oil. In this embodiment, the volume of the cooling medium surrounding the friction surface assembly is controlled by a control valve by implementing the control through a run-in and run-out to the interior cavity of the clutch assembly. In order to obtain a respective cooling effect, it is often also necessary to increase the pump power in order to provide the respective coolant volume. The particular solutions are then characterized by significant additional complexity.

Thus, it is the object of the invention to improve a clutch assembly of the type recited supra, so that it implements a local coolant loop for the friction assembly, wherein the embodiment shall be characterized by low design and manufacturing complexity. Furthermore, a closed loop for the friction assembly shall be implemented in a simple manner, which is effective only locally in the portion of the friction assembly and which flows through the particular friction surface bearing elements several times. High cooling efficiency is desired as an additional requirement.

SUMMARY OF THE INVENTION

The solution according to the invention is characterized by the features of the clutch assembly described and force transmission device described below.

A clutch assembly, in particular for use in force transmission devices for motor vehicles, comprising an input and an output, a housing assembly, which is filled or fillable with fluid, a friction assembly with a first friction surface assembly connected torque proof with the input or forming said input, and a second friction surface assembly connected torque proof to the output or forming said output, which can be brought into operative engagement with one another through an operating device, wherein each friction surface assembly comprises at least one friction surface bearing element, and wherein a fluid flow can be generated in the housing assembly for cooling the friction surface assemblies, which clutch assembly according to the invention comprises means for generating at least one loop flowing through at least one friction surface bearing element of the friction assembly plural times, and routing the fluid flow, before the fluid flow exits from the clutch assembly. Said loop is generated when there is a speed difference between friction surface bearing elements of the different friction surface assembly, which friction surface bearing elements can be brought into operative engagement with one another. At least one cooling fluid supply is associated with the housing assembly, wherein the supply of fluid generates a coolant flow over at least a portion of the friction surfaces. According to the invention, multiple flow-through occurs in a local loop of at least one friction surface bearing element of a friction surface assembly. The supply of fluid to the housing assembly can be performed continuously with open cooling, or discontinuously in particular with closed cooling. Thus, a local cooling loop is formed within the friction assembly, which becomes effective directly at the friction assembly. Thereby, and by multiple flow-through, the coolant can optimally absorb heat through heat transfer and heat routing, or can also evenly distribute heat before the coolant exits from the clutch assembly. By supplying fluid, in particular coolant, into the housing assembly, a constant exchange of coolant from the local loop can also be performed, in particular by displacement due to the subsequent fluid in the flow. Thus, the portion of the cooling medium removed from the local loop is determined by the supply. Thus, the local loop is an element of a super ordinate cooling loop, which assures the supply and the removal of cooling medium in the clutch assembly, in particular in the friction assembly.

Since the means are at least partially provided in the friction surface bearing elements, the coolant flow can be maintained without additional pressurization of the outside.

The means comprise cooling channels, which define the path of the particular loop in flow direction and whose extension in the desired flow-through direction from a radially inner portion towards a radially outer portion or vice versa in or at a friction surface bearing element is characterized by a directional component in circumferential direction in rotation direction of the particular friction surface assembly.

As a matter of principle, two basic variants exist. Both options are based on using slippage between the friction surface bearing elements, when they are brought into operative engagement with one another and the options are based on the configuration of the coolant routing channels being configured according to the invention. These are configured according to the invention as already stated supra, so that depending on the desired flow direction, an orientation between the inner circumference and the outer circumference of the respective element bearing a cooling channel is performed in circumferential direction. Thus, the orientation of the single channel is not performed directly in radial direction, but always with a directional component in rotation direction viewed in the desired flow direction for the cooling medium.

According to a first embodiment of the invention, the cooling of the friction assembly is performed through a closed cooling loop associated with the friction assembly, which cooling loop is only routed through the friction assembly. The second embodiment is characterized in that the coolant flow is only run in one direction over the friction assembly or through the friction assembly and the reversal is performed externally. The first solution has the advantage that the coolant routing is characterized by very short distances herein. Furthermore, the measures can be restricted to one friction surface assembly or to both friction assemblies. The advantage of the first option is that only one friction surface assembly has to be modified with the cooling channels, while standard components can be used for the other. In the first case, there is furthermore the option to associate means for generating a loop with a single friction surface bearing element, or with two adjacent friction surface bearing elements adjacent to one another. In this case, a friction surface assembly is preferably selected for the friction surface bearing element, which friction surface assembly bears a friction liner, and the means are integrated into the friction liner. Thus, coolant flows are generated at the particular friction liners of a friction surface bearing element, and the particular friction element is flowed through at several locations in a respectively cooling manner. The configuration of the cooling channels in the friction liners has the advantage that the heat is directly removed at the locations with very high local temperatures, and furthermore in the areas which are less heat resistant anyhow. Furthermore, the friction liners are also wear components, which configure the friction surface bearing elements exchangeable anyhow, so that depending on the embodiment and the application slightly different cooling concepts can be implemented by replacing a friction surface assembly at the friction assembly.

When conducting the loop within a friction surface assembly, the particular loop can be conducted through two friction liners of a friction surface assembly disposed adjacent to one another, wherein these are either disposed at a friction surface bearing element of a friction surface assembly, or at two friction surface bearing elements of a friction surface assembly disposed adjacent to one another, wherein the friction surface bearing element disposed in between in axial direction of the other friction surface assembly bears a pass-through opening, which extends preferably parallel to the rotation axis of the clutch assembly for flow-through.

According to another improvement, it is provided to route the cooling medium through two friction surface assemblies. In this case, the coolant flow still remains in the friction assembly and it is run from the first one to the second one or vice versa.

When a single loop is run through both friction surface assemblies, the routing is performed through two adjacent disposed friction surface bearing elements of the two friction surface assemblies. A first cooling channel for routing the loop is then preferably disposed at a friction liner of a friction surface bearing element of a friction surface assembly, and the other cooling channel is disposed in the friction surface bearing element of the other friction surface assembly, which friction surface bearing element is adjacent to said friction liner.

According to an advantageous embodiment, two loops can also use common channels. In this case, the number of the required channels is increased. The cooling channels disposed for conducting two loops are disposed e.g. at the friction liners of two adjacent friction surface bearing elements of a friction surface assembly, wherein the reversal routing for both loops is performed through the friction surface bearing element of the other friction surface assembly, which friction surface bearing element is disposed in between.

The second solution approach, which is characterized by a routing only in one direction through the friction assembly, comprises means for generating the coolant flow, which are only disposed at a friction surface assembly, and it is furthermore characterized by a reverse routing option outside of the friction assembly. Thus, at least a portion of the loop is conducted through a friction surface bearing element of a friction surface assembly. The other portion of the cooling loop can be conducted in the housing assembly. In one embodiment, a particular loop is associated with each friction surface bearing element in a plurality of friction surface bearing elements, wherein the flow-through direction is the same in all friction surface bearing elements.

In order to increase the cooling efficiency, the friction surface assembly bearing the cooling channels is connected with the input of the clutch assembly.

The second basic variant is characterized in that a cooling loop is generated, which is run through a friction assembly, wherein the friction assembly is a portion of the loop flow generated substantially by itself, and which is only flowed through in one point of the loop in one direction.

The flow-through of the two basic variants occurs due to the blade effect of the fluid feeding channels, for the second basic variant, it occurs due to the mandatory rotation with the higher speed of the drive, wherein coolant is fed through the friction assembly, when slippage exists between the friction surface assemblies.

According to the second basic variant, the coolant quickly removes the heat from the friction assembly after each passage through the friction assembly, and it can dissipate the heat far away from the friction assembly due to the external routing before the coolant flows through said friction assembly again.

Since the coolant enters at all friction surface bearing elements with approximately the same temperature due to the routing in the same direction, all friction surfaces can be cooled evenly.

The cooling is a function of the slippage. The effectiveness increases with higher slippage between the friction partners without any additional control complexity.

In all embodiments in the simplest case, the particular cooling channel is configured as a groove fabricated into the surface of the friction surface of the friction surface bearing element. Integral pass-through openings are also conceivable. The particular channel extends from the portion of the inner circumference to the outer circumference or vice versa over the friction surface bearing element or at said element.

Preferably, a plurality of cooling channels is provided at a friction surface.

With respect to the configuration of the cooling channel, there is a plurality of options.

The particular cooling channel can be configured straight or with a flow direction change, e.g. arc- or S-shaped. In order to influence the flow velocities, the particular cooling channel can be configured in flow direction with a decreasing or increasing cross section surface.

The solution according to the invention is preferably used in force transmission devices. They can be configured as combined torque converter-/lockup unit or as a twin clutch. However, the solution is also applicable for single clutch assemblies.

BRIEF DESCRIPTION OF THE SEVERAL VIEWS OF THE DRAWINGS

The solution according to the invention is subsequently described with reference to drawing figures, wherein:

FIG. 9 illustrates a first variant of a second embodiment with reference to a detail of a clutch assembly;

FIG. 10 illustrates possible groove patterns with reference to a view of a friction surface bearing element;

DETAILED DESCRIPTION OF PREFERRED EMBODIMENTS OF THE INVENTION

Figure 1A:
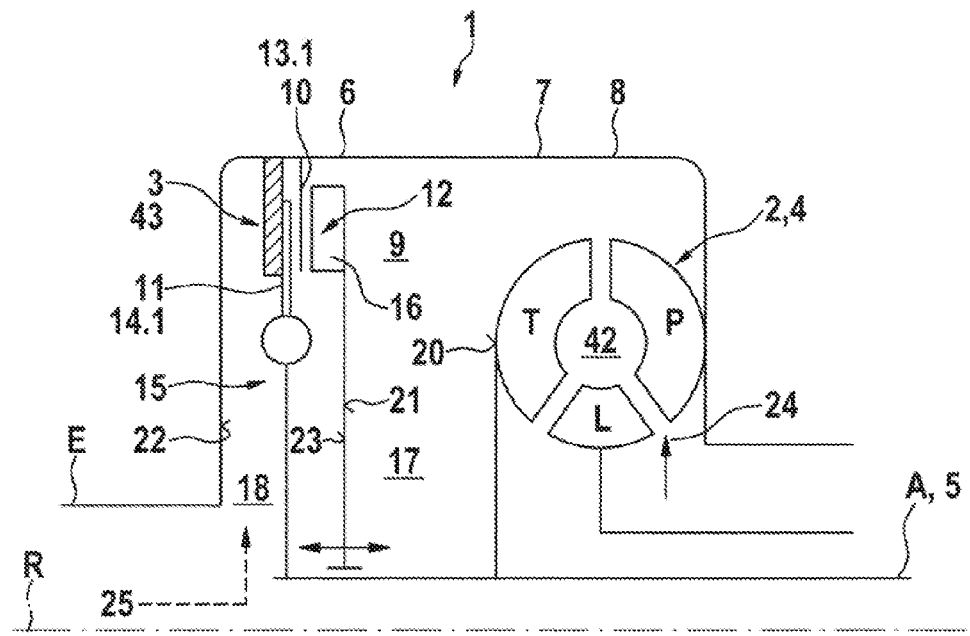
FIGS. 1a and 1b illustrate embodiments of force transfer devices with a clutch assembly with a coolant loop according to the invention.
Figure 1B:
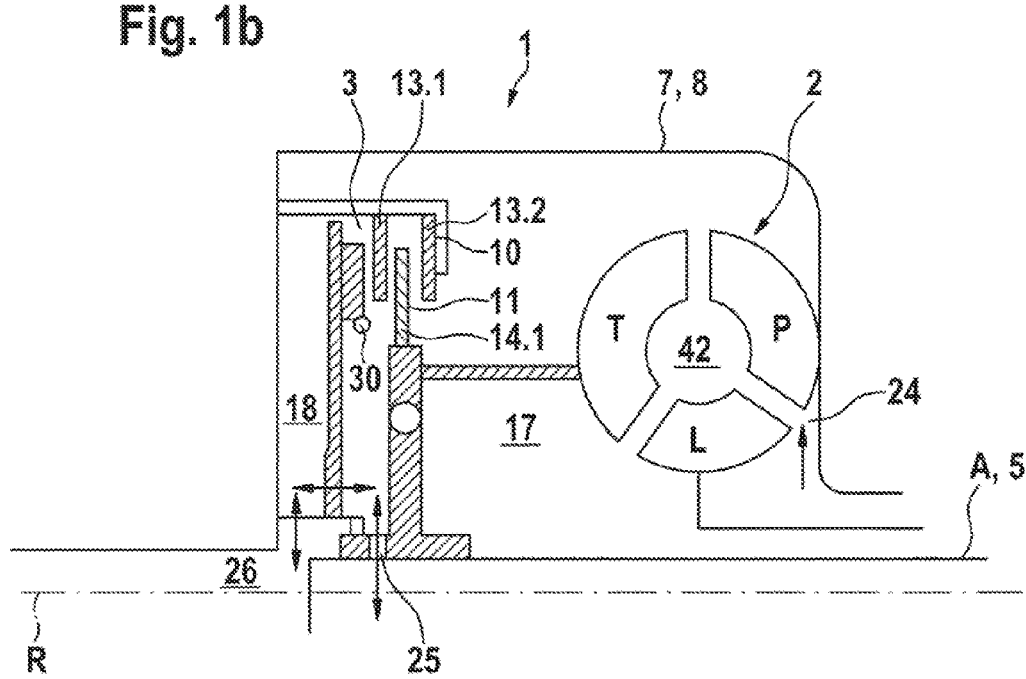

FIGS. 1a and 1b illustrate the basic configuration of force transmission devices 1 in a schematic simplified illustration, in which a coolant routing according to the invention can be used, comprising an input E, an output A, a hydrodynamic component 2 and a clutch assembly 3 configured according to the invention. The clutch assembly 3 is thus configured for at least partial circumvention of the power transmission through the hydrodynamic component 2.

The hydrodynamic component 2 comprises at least one primary shell functioning as a pump shell P and a secondary shell functioning as a turbine shell T, which form an operating cavity 42, which can be filled with operating means. Depending on the embodiment of the hydrodynamic component 2, it is either provided as a hydrodynamic speed-/torque converter 4 as illustrated in FIGS. 1a and 1b, or it is configured as a hydrodynamic clutch. In the first case, at least one stator shell L is additionally provided between the pump shell P and the turbine shell T. The pump shell P is thus connectable torque proof or preferably connected torque proof to an input E of the force transmission device, while the turbine shell T can be connected torque proof with an output A of the force transmission device. Typically, the output A of the force transmission device is a transmission input shaft 5 of a transmission unit, which is installed after the force transmission device 1, but which is not shown here. When the hydrodynamic component 2 is configured as a hydrodynamic speed-/torque converter 4, it functions as a hydrodynamic transmission and it is used for speed- as well as for torque conversion. In the embodiment of the hydrodynamic component, which embodiment is not shown here, as a hydrodynamic clutch, it does not comprise a stator shell and it is only used for speed conversion. The pump shell P is connected torque proof in both cases with the input of the force transmission device 1, while the turbine shell T can be connected torque proof with the output of the force transmission device 1. The engineering design of said coupling can be performed in different ways. The FIGS. 1a and 1b herein only illustrate the possible functional connections in a simplified schematic illustration.

The clutch assembly 3 comprises a housing assembly 6, which is formed by the housing 7 of the first transmission device 1, when the clutch assembly 3 is disposed in the force transmission device 1. When the hydrodynamic component 2 is configured as a hydrodynamic speed-/torque converter, the housing 7 is preferably formed by a housing shell 8 coupled torque proof to the pump shell. Thus, said housing shell encloses the turbine shell T in axial direction and in circumferential direction entirely, forming an inner cavity 9 for the disposition of the clutch assembly 3. The clutch assembly 3 which is also designated as a lockup clutch is thus used for circumventing the hydrodynamic power transmission between the input E and the output A of the force transmission device 1, and thus through the hydrodynamic speed-/torque converter 4. The clutch assembly 3 comprises a friction assembly 43 comprising a first friction surface assembly 10 and a second friction surface assembly 11, which can be brought at least indirectly into operative engagement with each other through an actuation device 12, this means can be connected with one another through friction locking. The particular friction surface assemblies 10 and 11 each comprise a friction surface bearing element 13.1-13.n or 14.1-14.n, wherein the friction surfaces are formed directly by the elements, in particular by the faces or by additional friction liners. In the simplest case, the first friction surface assembly 10 is connected at least indirectly torque proof with the input E of the force transmission device 1, preferably coupled directly torque proof with said force transmission device, and the second friction surface assembly 11 is connected at least indirectly torque proof with the output A of the force transmission device 1, i.e. directly connected with the output A, or through a device 15 for damping vibrations. The actuation device 12 preferably comprises a piston element 16, which becomes effective at the friction surface assemblies 10 or 11. Depending on the configuration, the piston element 16 can thus be supported either at least indirectly torque proof with the output A, but movable in axial direction with respect to said output, or torque proof with respect to the input E of the force transmission device and axially movable. Furthermore, there is the option that the piston element 16 itself is a component of a friction surface assembly 10, 11, in particular of the first friction surface assembly 10, wherein said component carries e.g. a friction surface. The piston element 16 divides the inner cavity 9 defined by the housing into two chambers, e.g. pressure cavities 17 and 18, which are sealed relative to each other when the clutch device 3 is engaged or when it slips. The first chamber 17 is thus defined by the face 21 of the piston element 16 oriented towards the outer circumference 20 of the speed-/torque converter and by the speed-/torque converter 4, while the second chamber 18 is formed by the face 23 of the piston element 16 oriented away from the outer circumference 20 of the converter 4, and by the inner wall 22 at the housing face oriented towards said face 23. The third chamber is formed by the operating chamber 42 of the converter. FIG. 1a thus illustrates an embodiment with two connections; a first connection 24 and a second connection 25, while FIG. 1b, on the other hand, discloses an embodiment with three connections and comprises another third connection 26, which is used for direct loading the pressure cavity, in particular of the second chamber 18.

In the embodiment according to FIG. 1a, two connections are illustrated. The first connection 24 is connected to the operating cavity 42. The second connection 25 is associated with the chamber 18.

When the hydrodynamic component 2 is configured as hydrodynamic speed-/torque converter 4, the hydrodynamic speed-/torque converter 4 is filled once. The power transmission in converter operation is performed form the input E to the pump shell P through the flow loop in the operating cavity 42 onto the turbine shell T and through the coupling of the turbine shell T with the output A onto said output. The operating means remains in the converter also when a lockup is performed through the clutch assembly 3 and it forms only a type of outer loop which is used for cooling purposes and which exchanges the operating fluid or routes it in a loop for cooling purposes. Furthermore, the pressure in the chamber 17 can be used for lockup, since said pressure is much higher, than in the chamber 18, the actuation device is engaged. The power transmission through the hydrodynamic component 2 is thus interrupted.

Through the two connections 24 and 25, the actuation of the force transmission device 1 and of the cooling are controlled. When the operating means is conducted through the connection 25, this means through the chamber 18, a flow-through is performed through the clutch assembly 3 into the operating cavity 42 of the hydrodynamic component 2, in particular of the hydrodynamic speed-/torque converter 4.

The outflow is performed through the connection 24. Thus, an external cooling loop for the operating means of the hydrodynamic speed-/torque converter 4 can be configured through the connection 24. The routing of the operating means can be performed within the force transmission device 1 or outside of it, wherein additional cooling devices, e.g. heat exchangers, can be flowed through. In order to actuate the lockup clutch, a loading of the piston element 16 is performed through the chamber 17, which is coupled to the operating cavity 42. Thus, the pressure in the operating cavity 42 is increased and causes an increase in the chamber 17, so that the piston element 16 is moved relative to the friction surface assemblies 10 and 11. These are brought into operative engagement with one another, this means they are connected friction locked. The power transmission is then performed through direct coupling between the input E and the first friction surface assembly 10 with the second friction surface assembly 11 and its at least indirect connection with the output A between input E and output A, while circumventing the hydrodynamic speed-/torque converter 4. For this purpose, the flow-through direction is changed. Through the connection 24, a higher pressure is applied to the operating cavity 42. The operating means moves outside in radial direction through the gap between the pump shell P and the turbine shell T. A power transmission between the pump shell P and the turbine shell T thus does not occur through a flow loop anymore. Thus, however, operating fluid is moved in radial direction outward in the gap between the pump shell P and the turbine shell T during the further rotation of the hydrodynamic speed-/torque converter, and can be routed into the chamber 18 through the clutch assembly 3, which comprises cooling channels 27.1, 27.2 for this purpose, which extend through the friction assembly 43, and can be removed through the connection 25. The connection 25 can be coupled to the connection 24 for feeding back the operating means to the operating cavity 42.

On the other hand, FIG. 1b illustrates an embodiment with another third connection 26. It is used in particular for loading the piston element 16 of the actuation device 12 irrespective of the pressure conditions in the hydrodynamic speed-/torque converter 4 or in the particular chambers 24 and 17. The chamber 18 is configured, between the piston element 16, in particular the actuation device 12 and the housing 7, pressure and liquid tight relative to the other chambers, in particular with respect to the chamber 17 or 42. In this embodiment, the operating fluid routing is a hydrodynamic component 2 and thus independent from the pressure loading of the actuation device 12. Said operating means routing can thus be performed at will centripetal or centrifugal. The second connection 25 is associated herein with the operating cavity 17, while the operating cavity 18 comprises a third connection 26. The embodiments for force transmission devices illustrated in FIGS. 1a and 1b are examples and only intended to emphasize the universal applicability. The detailed engineering design is not being addressed at all.

For the particular embodiments of the force transmission device 1, the clutch assembly 3 according to the invention is configured, so that it can form a local inner coolant routing 30, which runs through the particular friction assembly 43 repeatedly, preferably runs through it at least twice before the coolant run in this local coolant routing is replaced. Thus, a difference is made between different coolant loop routings. The particular possible coolant loop routings can thus be divided into two basic variants. A first variant is characterized in that the cooling loop routing is performed at the friction assembly 43, while the second one is characterized in that only a portion of the loop routing is performed at the friction assembly 43 and in that the return is implemented outside of the friction assembly. When configuring the cooling loop within the friction assembly, this means outward routing and return routing in closed loop respectively at the elements of the friction assembly, in particular the single friction surface assemblies 10 and 11, a differentiation can thus be made between embodiments with a routing only at one friction surface assembly 10 or 11, or at both friction surface assemblies 10 and 11 in one loop. The particular friction surface assemblies, in particular the first friction surface assembly, the second friction surface assembly 10, 11, for this purpose comprise at least one, preferably a plurality, of friction surface bearing or friction surface forming elements 13.1-13.n, 14.1-14.n. Preferably, a respective friction surface assembly 10 or 11 is configured with friction surface elements, which comprise friction liners 31.1-31.n.

Figure 3:
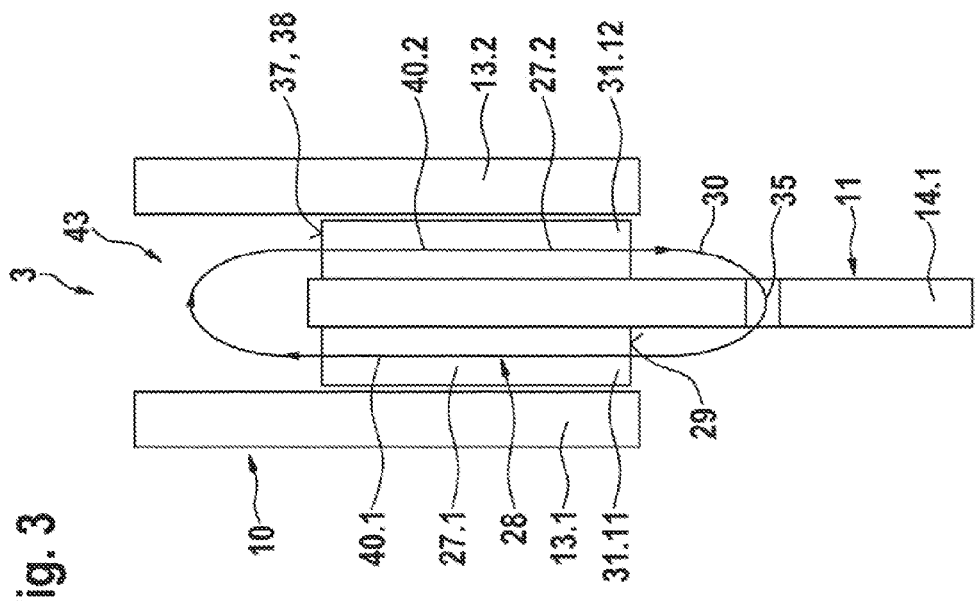
FIG. 3 illustrates a second variant of a first embodiment with reference to a detail of a clutch assembly.
Figure 2:
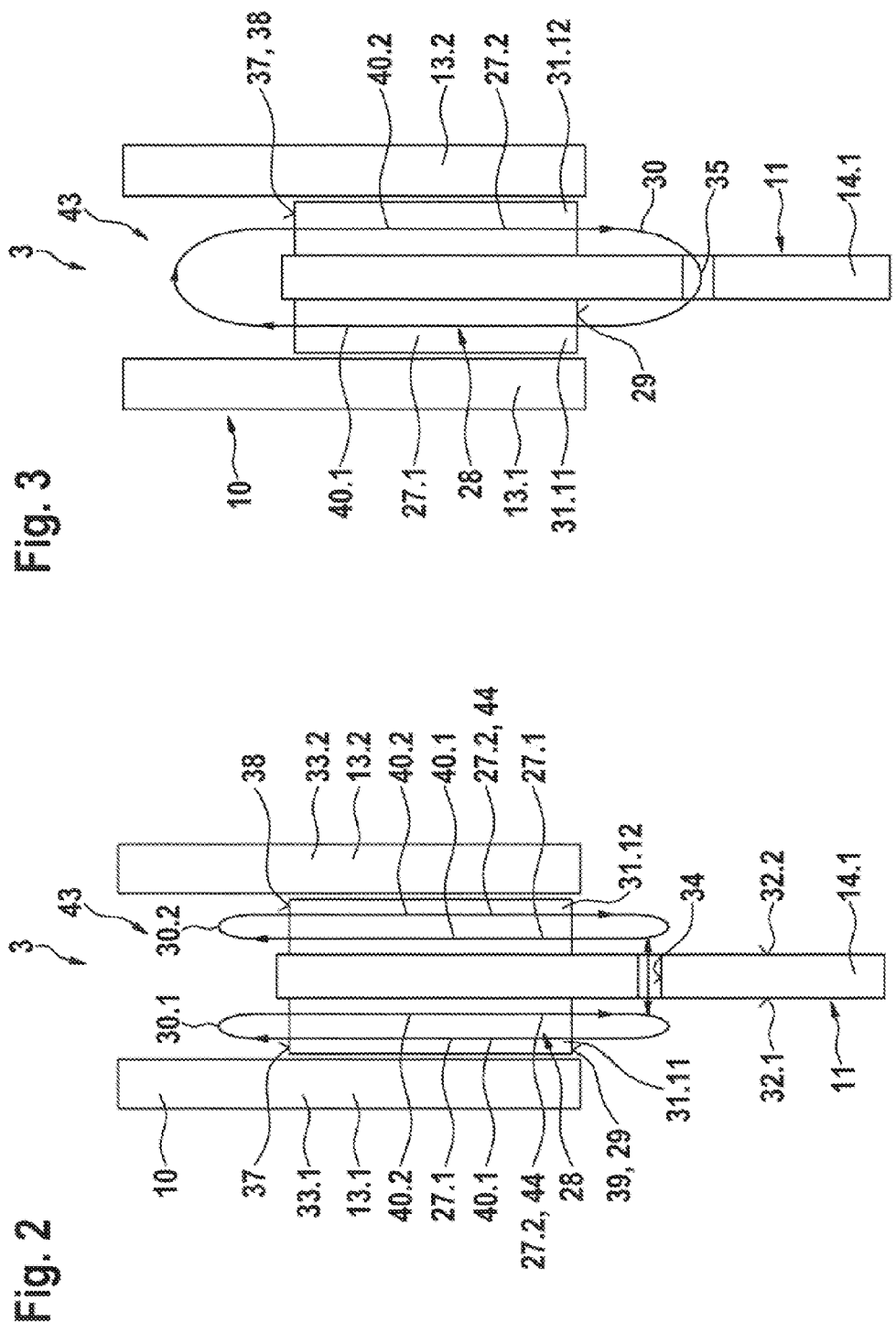
FIG. 2 illustrates a first variant of a first embodiment with reference to a detail of a clutch assembly.
Figure 4A:
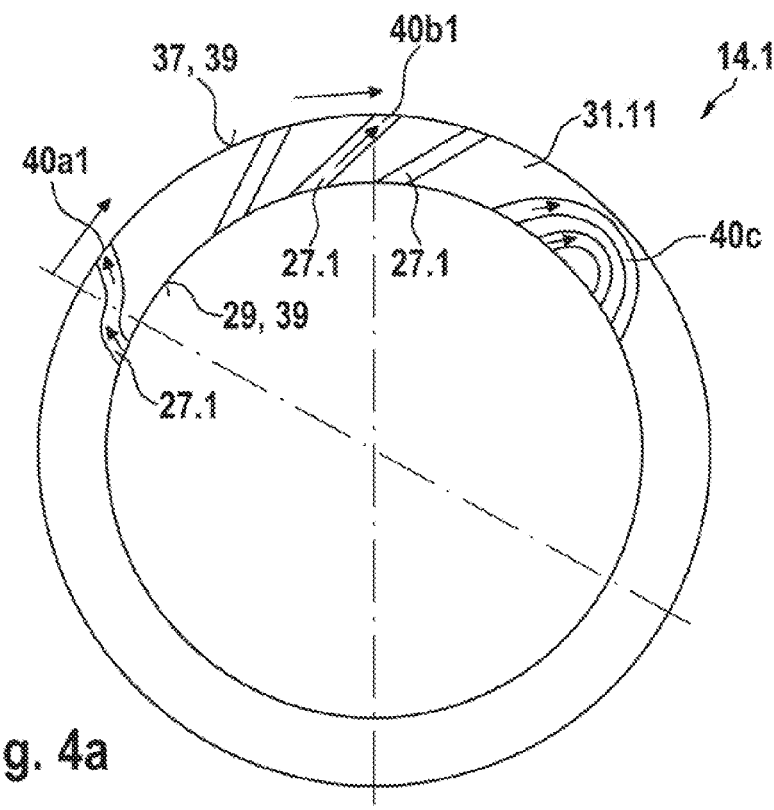
FIGS. 4a and 4b illustrate possible groove patterns for embodiments according to FIGS. 2 and 3.
Figure 4B:
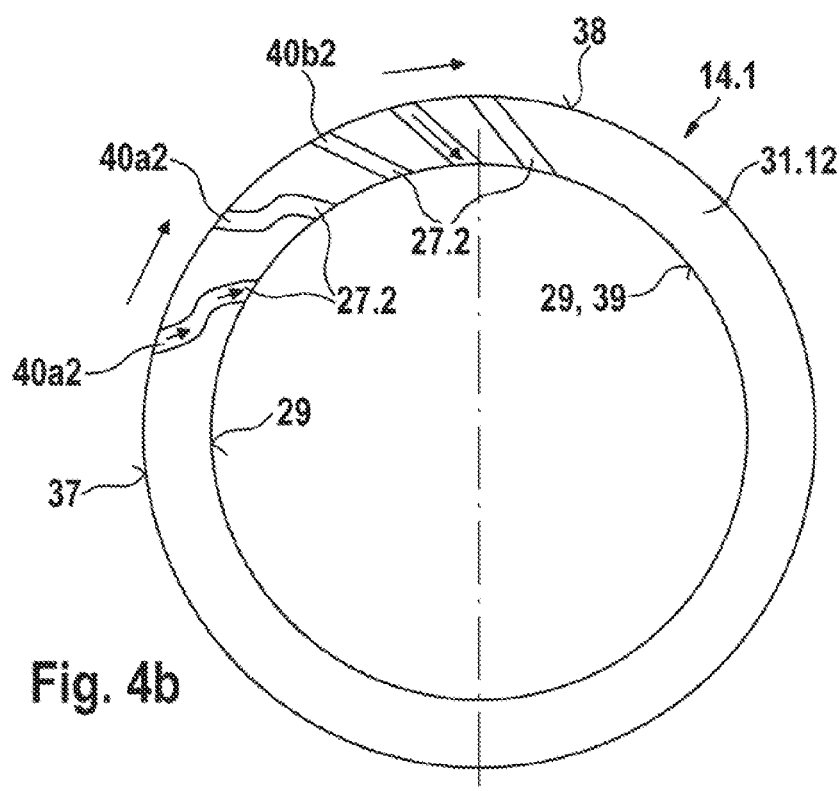
Figure 5:
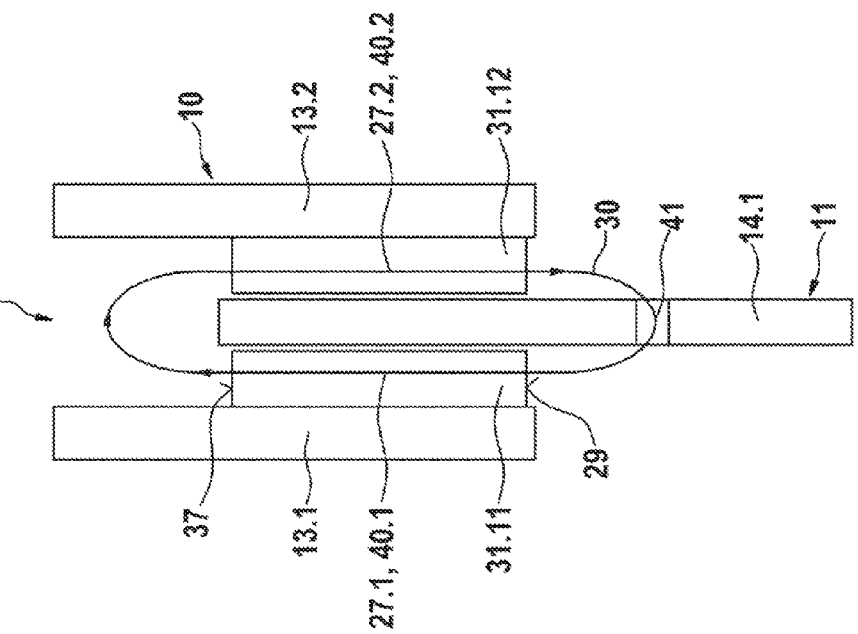
FIG. 5 illustrates a third variant of a first embodiment with reference to a detail of a clutch assembly.

The FIGS. 2 through 8 thus illustrate possible embodiments of the particular friction surface assemblies 10 and 11 with reference to a detail. Preferably, these can comprise a plurality of such friction surface bearing elements 13.1-13.n or 14.1-14.n. Only the friction pairing between friction surface bearing elements of a first friction surface assembly 10 and a second friction surface assembly 11 is always shown respectively, wherein the first friction surface assembly 10 is configured in an exemplary manner as an outer disk, and the second friction surface assembly 11 is configured as an inner disk. The FIGS. 2, 3 and 5 illustrate the local cooling loop routing only at one friction surface assembly 10, 11. The FIGS. 2 and 3 illustrate the option to route the cooling loop at the friction surface assembly 11. FIG. 5 illustrates a cooling loop routing at the friction surface assembly 10.

According to FIG. 2, thus the second friction surface assembly 11 configured as inner disk supports the friction liners. These are designated here for a friction surface bearing element 14.1 as 31.11 and 31.12. The friction liners 31.11 and 31.12 are thus disposed at the faces 32.1 and 32.2 of the friction surface bearing element 14.1. The adjacent friction liners are thus used for configuring the coolant loop 30 in the form of a closed loop. According to FIG. 2, a coolant loop 30.1 and 30.2 is respectively generated at the particular friction liners. This is a closed loop; this means cooling medium is fed in radial direction from the outside inward through the friction liner 31.11 and it is redirected backward to the radial outside while closing the loop 30.1 or 30.2. Thus, the redirection is performed respectively by the pressures on both sides of the friction liners 31.11 or 31.12 in radial direction. Furthermore, the feed effect is assured through the channel routing in the friction liners 31.11 and 31.12, which facilitates a reversal already at one friction liner. For this purpose, cooling channels 27.1 or 27.2 oriented in opposite directions are provided offset relative to one another in axial direction or disposed behind one another in circumferential direction, which support the feed effect in the respective direction. The channels 27.1 are used for feeding from the inner circumference 29 to the outer circumference 37, the channels 27.2 are used for feeding in reverse direction. This feed effect is thus assured, on the one hand, by the speed difference between the friction surface partners, in particular the friction surface assembly 11 and the friction surface assembly 10, wherein the friction surface assembly 11 rotates more slowly in the illustrated case when there is slippage, this means at a lower speed than the friction surface assembly 10, and thus the cooling medium is sucked in during the rotation basically due to the pressure differences, and it is dragged along through the channels 27.1 or 27.2 accordingly through adhesion and inner friction. The friction surface bearing elements 13.1, 13.2 are configured here in an exemplary manner as a straight steel disk 33.1, 33.2. Other embodiments are conceivable. In the illustrated case, such a coolant loop 30.1, 30.2 is generated at each friction liner 31.11 and 31.12. The coolant loop 30.1 or 30.2 is thus configured, so that when the lockup clutch is closed, in particular during the slippage condition, the coolant loop 30.1 or 30.2, in particular the coolant flows through the particular friction liner 31.11, 31.12 several times, and both loops 30.1 and 30.2 are maintained at the friction surfaces 31.11 and 31.12 through additional means 34.

In order to generate the local cooling loop 30, which flows through the friction assembly 43 plural times, means 28 are provided. These comprise the configuration of a channel routing for the coolant channels 27.1, 27.2, which enhances flow-through. The flow-through is thus respectively performed from the outer circumference 37 to the inner circumference 29 of the friction liners 31.11 and 31.12 and the other way around.

The channels 27.1 and 27.2 can be configured as grooves 40.1 or 40.2 or as groove 27.1 and pass-through opening 44, or, which is not illustrated as two pass-through openings. Thus, an offset is performed in circumferential direction relative to one another.

According to FIG. 3, there is no particular coolant loop 30 associated with each friction liner 31.11 and 31.12, but a coolant loop 30 is associated with the friction liners 31.11 and 31.12 disposed on both sides at a friction surface bearing element 14.1, wherein the one friction liner 31.11 forms the routing in radial direction from the inner circumference 29 to the outer circumference 30 outward, and the adjacent friction liner forms the routing of the coolant in radial direction inward for closing the coolant loop 30 through a pass-through opening in the friction surface bearing element 14.1. The pass-through opening is designated with 35 in this case. When the cooling channels 27.2 and 27.1 acting according to FIG. 2 as feed and back feed channels are provided at the same element, in particular at the friction liner 31.11 or 31.12, the channels for both feed devices 27.1 and 27.2 are provided according to FIG. 3 at two adjacent friction liners 31.11 and 31.12 of a friction surface bearing element 14.1.

In FIG. 2, a pressure relief is provided also in the form of a pass-through opening 34 in the inner disk 14.1, which extends substantially perpendicular to the faces or coaxial to the rotation axis R and which connects the two pressure cavities with one another on both sides of the inner disk.

In the embodiments according to FIGS. 2 and 3, the generation of the coolant flow, in particular of the coolant loop 30 or 30.1, 30.2, is performed respectively through the friction liners 31.11 and 31.12, wherein either the coolant loop is only generated at one friction liner, or through both friction liners of a friction surface forming element 14.1 of the friction surface assembly 10. The coolant routing is performed by the particular channel routing in the friction liners 31.11, 31.12. Thus, reference is made to the FIGS. 4a and 4b for possible channel routings and orientations of the means 28. Thus, these illustrate the orientation of the channels 21.1, 27.2 for the two friction liners 31.11 and 31.12 according to FIG. 3.

FIG. 4a thus illustrates the possible channel routing in the friction liner 31.11, while FIG. 4b illustrates the channel routing for the friction liner 31.12. When implementing or using clutch assemblies 3 in a force transmission device 1 according to FIG. 1a or 1b, depending on the embodiment as a two- or three channel force transmission device, a cooling flow is always routed through the clutch assembly 3. Said cooling flow is thus typically routed from the radial outside to the radial inside. Thus, accordingly configured channels are provided in one of the friction liners 31.11, 31.12, here in particular, in the friction liner 31.12, which channels are oriented in radial direction in the direction of rotation in circumferential direction, viewed in installed position, which channels extend from the radial outer circumference 38 of the element bearing the cooling channel, here the friction liners 31.12, to the inner circumference 39, here the inner circumference 29 of the friction liners 31.11, 31.12, so that the cooling medium is routed from the radial outer circumference to the inner circumference and redirected due to the slippage between the friction surface assemblies 10 and 11, which can be brought into operative engagement with one another, and thus, the respective friction partners, herein for the friction liner 31.12, the adjacent friction surface bearing elements 13.2 and routed through the pass-through opening 35 to the friction liner 31.11, and again dragged along due to the speed difference between the friction surface bearing element 13.1 and 14.1, and routed through the configuration of the channels configured in FIG. 4a, which extend viewed in rotation direction in radial direction from the inner circumference 39 to the outer circumference 38, wherein the extension does not occur in radial direction, but at an angle, this means inclined relative to radial direction, so that the coolant channel 27.1 or 27.2 comprises a directional component in circumferential direction. Through the internal friction of the cooling medium, this means the adhesion and the speed difference between the friction surface assemblies 10 and 11 and the pressure conditions caused thereby and the shearing of the coolant caused thereby, a reversal and redirection in the direction of the friction liner 31.12 is performed according to FIG. 3 or within a friction liner 31.12 upon exit from the friction liner 31.11.

The channel patterns illustrated in FIGS. 4a and 4b in the form of groove patterns include the embodiments as pass-through openings or grooves 40 fabricated at the surface of the friction liner. In an embodiment according to FIG. 2, the one respective groove 40.1 or 40.2, which feeds in radial direction from the inside towards the outside or from the outside towards the inside, can be fabricated in the surface of the friction liner, and the other respective groove is configured as a pass-through opening 44 in the friction liner, wherein an offset from one another is preferably performed viewed in axial direction. The different channel patterns are illustrated herein in an exemplary manner next to one another at a friction liner 31.11, 31.12 for illustration purposes. In practical applications, the particular friction surface bearing element is preferably only characterized by a uniform configuration of the groove patterns.

The groove patterns in FIGS. 4a and 4b are exemplary. Thus, straight grooves 40.1, 40.2 and also grooves with changes in the routing between inner the circumference 29 and outer circumference 37 are provided at the friction liner 31.11, 31.12. The same also applies for the embodiment as pass-through openings. The different groove patterns are illustrated herein in an exemplary manner as 40a1, 40a2, 40b1, 40b2 as well as 40c. Thus, FIG. 4a illustrates configurations at the friction liner 31.11 according to FIGS. 2 and 3. The configuration of the groove 40a1 is characterized by a directional change or by a discretionary channel routing between the inner circumference 29 and the outer circumference 37 of the friction liner 31.11. The orientation of the groove from the inner circumference 29 to the outer circumference 37 is thus implemented with a directional component in circumferential direction, wherein the directional component is oriented in rotation direction relative to the outer circumference 37.

This holds in analogy also for the groove pattern 40b1. Here, the groove pattern is illustrated in an exemplary manner at an angle α relative to the radial direction. The particular groove patterns 40*a*1 and 40*b*1 are exemplary as stated supra. These are preferably provided in multiples at a cooling channel bearing element, herein the friction liner 30.11, wherein the particular elements are offset from one another in circumferential direction. The offset can thus be uniform.

The groove pattern 40*c* illustrated in the friction liner 31.11 illustrates an embodiment as it can be implemented in particular for FIG. 2. Thus, the reverse routing can be performed here in a plane with the routing between the outer circumference 37 and the inner circumference 29, and enclosed within a friction surface, in particular a friction liner. The groove is then configured as a circular segment ring and extends as a circular arc from the inner circumference 29 in the direction towards the outer circumference without reaching said outer circumference and back again. FIG. 4*b*, on the other hand, illustrates the embodiment of the grooves viewed in rotation direction for the routing from the outer circumference 37 to the inner circumference 29. From this it is evident that also here, viewed in rotation direction, the desired flow routing is oriented between outer circumference 37 and inner circumference and the groove viewed here in rotation direction, is characterized by a direction component, which is oriented in circumferential direction towards the inner circumference 29. In this case, the redirection is performed directly within the friction liner 31.11, and it is not performed based on possibly additionally flowing in coolant, or based on increased pressure between the friction surface assemblies, which can be brought in operative engagement with one another.

The groove patterns can have different configuration with respect to geometry and furthermore with respect to their extension between inner- and outer circumference in radial direction. Thus, the orientation is preferably always performed at an angle to the radial connection line between the rotation axis and the outer circumference 37, or without a vertical position relative to the tangent at the outer circumference 37 and the inner circumference 29.

When FIGS. 2 and 3 illustrate embodiments with a disposition of the friction liners 31.11, 31.12 at the friction surface assembly 11, FIG. 5 shows a possible configuration of the friction surface assembly 10 in the form of an outer disk with friction liners 31.11, 31.12. The friction surface assembly 11 is then comprised of an inner disk, which is preferably configured as a straight steel disk and which does not have any friction liners. Also here, the configuration of the coolant routing grooves 27.1, 27.2 is implemented e.g. according to FIGS. 4*a* and 4*b*, this means at the two friction liners adjacent to one another, herein the friction liners 31.12 and 31.21 of the two adjacent friction surface bearing elements 13.1 and 13.2, so that a local cooling loop can be established. Said loop is fed by an operating means flowing in radial direction from the outer circumference 37 or from the outer disks towards the inner disks, which coolant e.g. comes from the coolant loop of the converter in force transmission devices 1 with a hydrodynamic speed-/torque converter 4. Routing the coolant flow is also performed here by a second friction surface assembly 11 through a pass-through opening, which is designated herein as 41. The coolant routing channels 27.1, 27.2 can be configured as pass-through openings or grooves 40.1 or 40.2.

Figure 6:
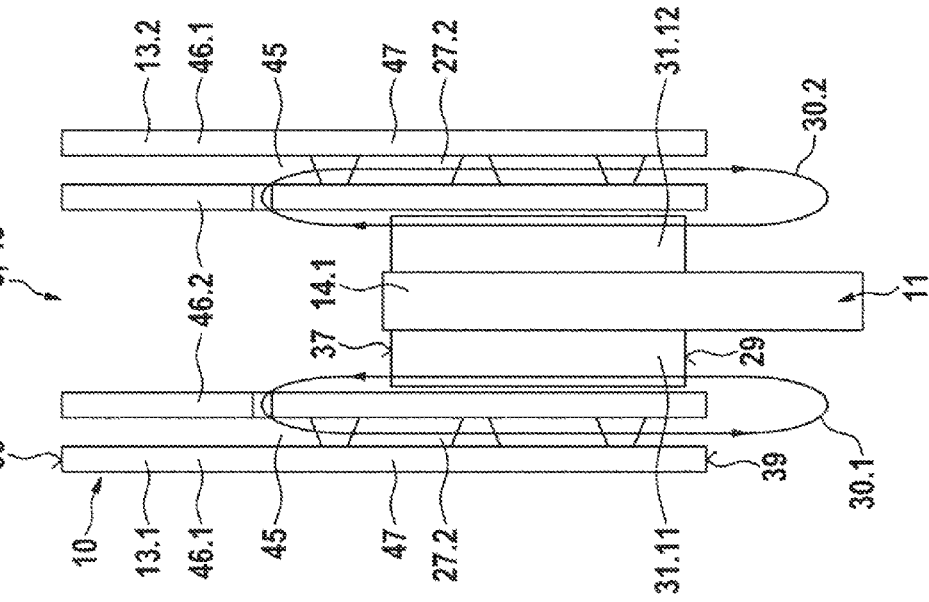
FIG. 6 illustrates a fourth variant of a first embodiment with reference to a detail of a clutch assembly.
Figure 8:
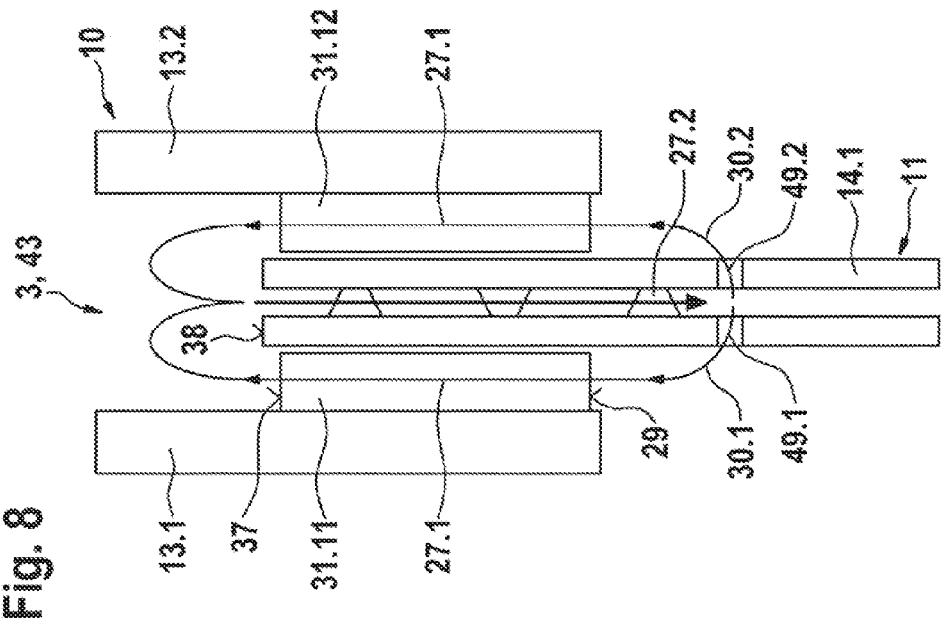
FIG. 8 illustrates a sixth variant of a first embodiment with reference to a detail of a clutch assembly.
Figure 7:
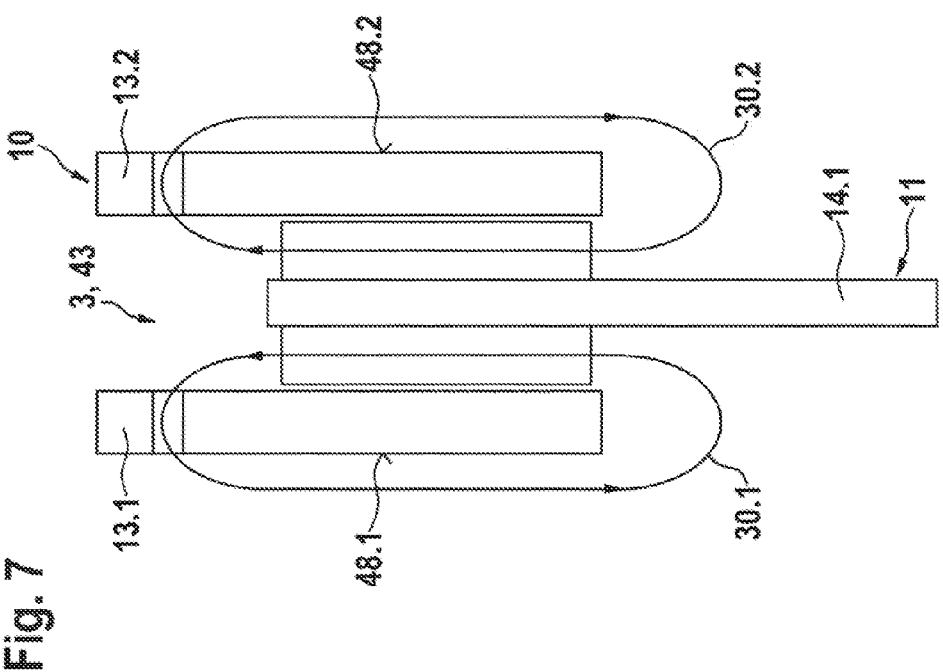
FIG. 7 illustrates a fifth variant of a first embodiment with reference to a detail of a clutch assembly.

By comparison, the FIGS. 6 through 8 illustrate embodiments with coolant routing, in particular configuration of the cooling loop 30.1, 30.2 through both friction surface assemblies, in particular the coolant channel routing through the friction surface assembly 10 or 11, bearing the friction liners 31.11, 31.12, and the adjacent friction surface bearing elements of the other respective friction surface assembly 11 or 10. In the FIGS. 6 and 11, the friction surface bearing elements, which are configured with friction liners 31.11-31.12, are formed respectively by the second friction surface assembly 11, here provided as inner disks. The friction surface bearing elements 13.1, 13.2 of the first friction surface assembly 10 do not have any friction liners. The routing is thus performed here over the two friction surface assemblies 10, 11 as a closed loop. Thus, the respective measures, on the one hand, are implemented at a single friction liner 31.11, 31.12, and, on the other hand, at the friction surface bearing elements of the other friction surface assembly 10 or 11. In this case, all friction liners of the second friction surface assembly 11 are configured with the same groove pattern, so that a cooling means flow in the same respective direction can be generated at the particular friction liners 31.11 and 31.12 in a simple manner, whose loop is then closed by a backflow through the slots 45 in the steel friction body. The slots 45 can thus have a different configuration in the simplest case, then a continuous slot is configured in the first friction surface bearing assembly 10, which slot can then also be oriented in radial direction, wherein said coolant flow is then redirected upon exit due to the speed difference between the two friction surfaces at the friction surface bearing element of the first friction surface assembly and of the second friction surface assembly, and fed due to the groove pattern configured in this location, which is configured in installed position viewed in rotation direction from the inner circumference 29 or the inner diameter to the outer diameter of the friction liner 31.11 or 31.12 respectively in circumferential direction.

Thus, according to FIG. 6, the routing can be performed in the friction surface assembly 10, here the friction surface bearing element 13.1 or 13.2, wherein said element is configured in plural component. The single friction surface bearing element 13.1 or 13.2 is respectively comprised here of the partial elements 46.1 and 46.2, which form a back-feed for the particular loop 30.1 or 30.2, either through the slot 45 or through the channel 27.2. The channel routing structure 47 is thus simultaneously used for coupling between the particular partial elements 46.1 and 46.2. Depending on the embodiment, it can also comprise the respective orientation of the channels 27.2 in circumferential direction, viewed in rotation direction, so that an orientation in circumferential direction is performed here from the outer circumference 38 to the inner circumference 29 of the cooling channel bearing elements.

According to FIG. 7, the friction surface assembly 10 is only used herein for routing the flow of the coolant flows 30.1 and 30.2, wherein the back-routing in the embodiment of the clutch assembly 3 is then only performed with the two friction surface bearing elements 13.1 and 13.2, configured as outer disks, wherein the routing is performed on the outside along the outer surfaces 48.1, 48.2 of the friction surface bearing elements 13.1 and 13.2, or when additional friction surface bearing elements of the second friction surface assembly 11 are disposed adjacent, the back-routing is performed through grooves configured at said elements.

On the other hand, FIG. 8 illustrates an embodiment with a configuration of the friction liners 31.11, 31.12 according to FIG. 5 at the first friction surface assembly 10 through the second friction surface assembly 11, which then has no liners. Thus, the friction surface assembly 11 can be e.g. provided in several components herein with gaps, slots, channels, etc. configured there between, so that a central flow from both coolant loops 30.1, 30.2 is brought to the pass-through openings 49.1, 49.2, this means brought to transition in the portions of the inner diameters 29 of the friction liners 31.11, 31.12.

The embodiments illustrated in FIGS. 2 through 8 only constitute options to generate a bidirectional flow, this means a flow within the disk packet or directly about said disk packet, in the form of a loop 30.1 or 30.2, which is passed through plural times.

However, according to another solution approach, it is also conceivable that the coolant only flows through the friction surface assembly 10 or 11 in one direction and is then routed back outside of the friction surface assembly 10 or 11. A first embodiment is thus illustrated in FIG. 9. In order to achieve the maximum flow-through possible, the feed grooves are only provided in the friction surface bearing elements of the friction surface assembly, which are coupled with the input E or with the drive of the clutch assembly 3 or of the force transmission device 1. It is characterized in that respective coolant routing grooves 40.1, 40.2 for the channels 27.1 are provided for the channels 27.1 e.g. in a clutch assembly 3 at the friction surface assembly 10, in particular of friction surface bearing elements 13.1 or 13.2. These are not the friction liners themselves, but they are friction surface bearing elements without friction liners. The cooling grooves 40.1, 40.2 are disposed here directly at the friction surfaces of the friction surface bearing elements 13.1 and 13.2. These are configured with respect to the groove pattern and with respect to their alignment according to the embodiment according to FIG. 4a. The back-routing is performed externally, this means offset from the friction surface assemblies 10, 11. Other possible embodiments are illustrated in an exemplary manner in FIG. 11. It is important that the orientation viewed in circumferential direction is configured in the direction from the inner circumference 29 to the outer circumference 38, wherein the respective cooling groove 40.1, 40.2 has a component in circumferential direction, this means it does not extend only in radial direction.

FIG. 10 illustrates possible groove configurations. These are designated with 40d, 40e, 40f and 40g. In these, the feed direction of the cooling medium is illustrated by an arrow and the rotation direction of the friction surface bearing elements including the cooling channels 27.1 is illustrated. The particular possible groove shapes are designated with 40d-40f herein. Thus, the particular cooling channel can be arc shaped, but with an inclination in circumferential direction. The flow routing direction is thus optional. Furthermore, a tapering of the channel is conceivable according to 40d and an expansion in flow direction is conceivable according to 40g.

Figure 11:
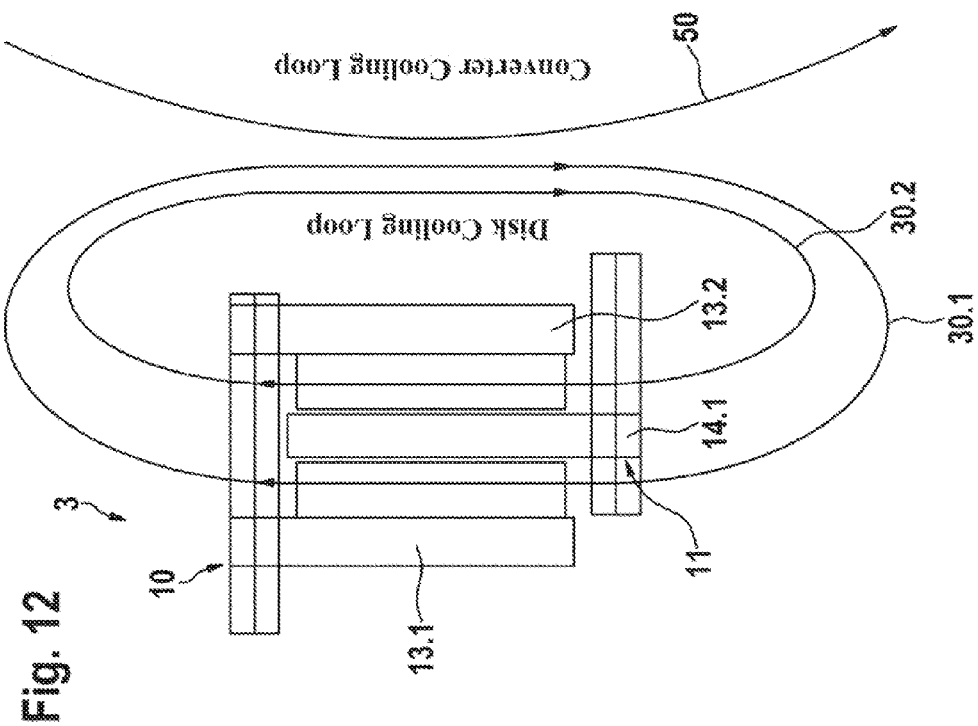
FIG. 11 illustrates a second variant of a second embodiment with reference to a detail of a clutch assembly.

FIG. 11 illustrates an embodiment with a configuration of the cooling channels 27.1 at the friction liners of the outer disk, and thus of the first friction surface bearing assembly 10. The back-routing is performed outside of the friction surface assembly, this means quasi in axial direction next to the friction surface assemblies 10 and 11. The configuration of the cooling channels is performed in the friction channels of the friction surface bearing elements 13.1 and 13.2 disposed adjacent to one another, wherein the friction channels are disposed in the same direction, this means viewed in installed position in radial direction from the inner circumference to the outer circumference, wherein the orientation is performed with a directional component in circumferential direction. Possible embodiments for grooves or cooling channels are illustrated in FIG. 10.

Figure 12:
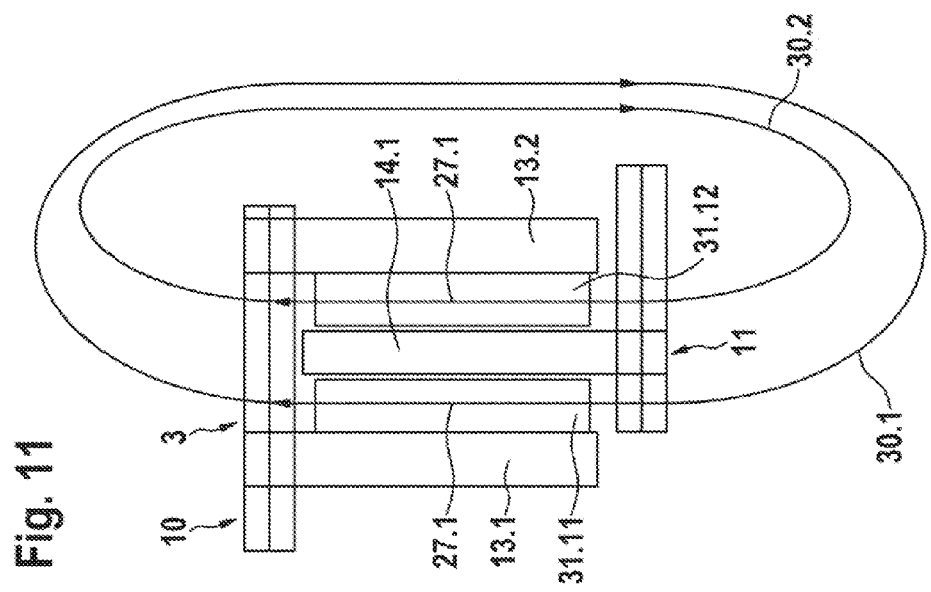
FIG. 12 illustrates the heat exchange with the converter loop with reference to FIG. 11; and, FIG. 13 illustrates an embodiment of a force transfer device with twin clutch assemblies with a coolant loop according to the invention.

FIG. 12 illustrates the independence of the local cooling loop from the converter loop 50 with reference to an embodiment according to FIG. 11 in a configuration of a clutch assembly in a force transmission device according to FIG. 1b, wherein a heat exchange can be performed herein through heat exchangers.

All embodiments are used for generating a cooling loop, in particular a local cooling loop, which runs through a friction surface packet. Said packet is a component of a closed loop flow mostly generated by said packet itself, and it is flowed through either only in one direction or in two directions. For this purpose, the fluid feeding cooling grooves of a friction disk clutch comprising a blade effect are being used. In order to facilitate a coolant flow, which is substantially higher than the coolant flow in the converter cooling loop, the friction surface bearing element which comprises the fluid feeding cooling grooves is formed by a friction surface bearing element of the friction surface assembly, which rotates with the input of the friction transmission device, this means with the speed of rotation of the drive. Thus, the coolant is fed through the cooling grooves by adhesion when slippage is present, due to the pressure distribution created in the portion of the coupled friction surfaces of the friction assembly, and due to the conditions prevailing in the coolant due to the pressure distribution, in order to remove the friction heat of the slipping clutch. The advantage of the embodiment is, that due to the integration into a fluid routing system, which can comprise a separate coolant loop, or which uses the coolant loop of another component, in particular which uses the coolant loop of a speed-/torque converter, the cooling medium flows through the clutch assembly several times. Thus, the absorbed thermal energy is quickly removed from the area of the disk packet after each passage of the disk packet.

In the embodiment according to FIGS. 9 through 12, the advantage is that the thermal energy can be dissipated outside of the clutch packet, wherein here additional means e.g. in the form of heat exchanges can be provided.

Furthermore, uniform cooling of all friction surfaces is assured, since in particular in case of a constant flow of the disk packet, the entry temperature of the coolant is substantially constant for all cooling grooves. The cooling is a function of slippage in all embodiments. It increases with increasing slippage between the friction partners. Thus, the clutch can also be used as a startup clutch.

Figure 13:
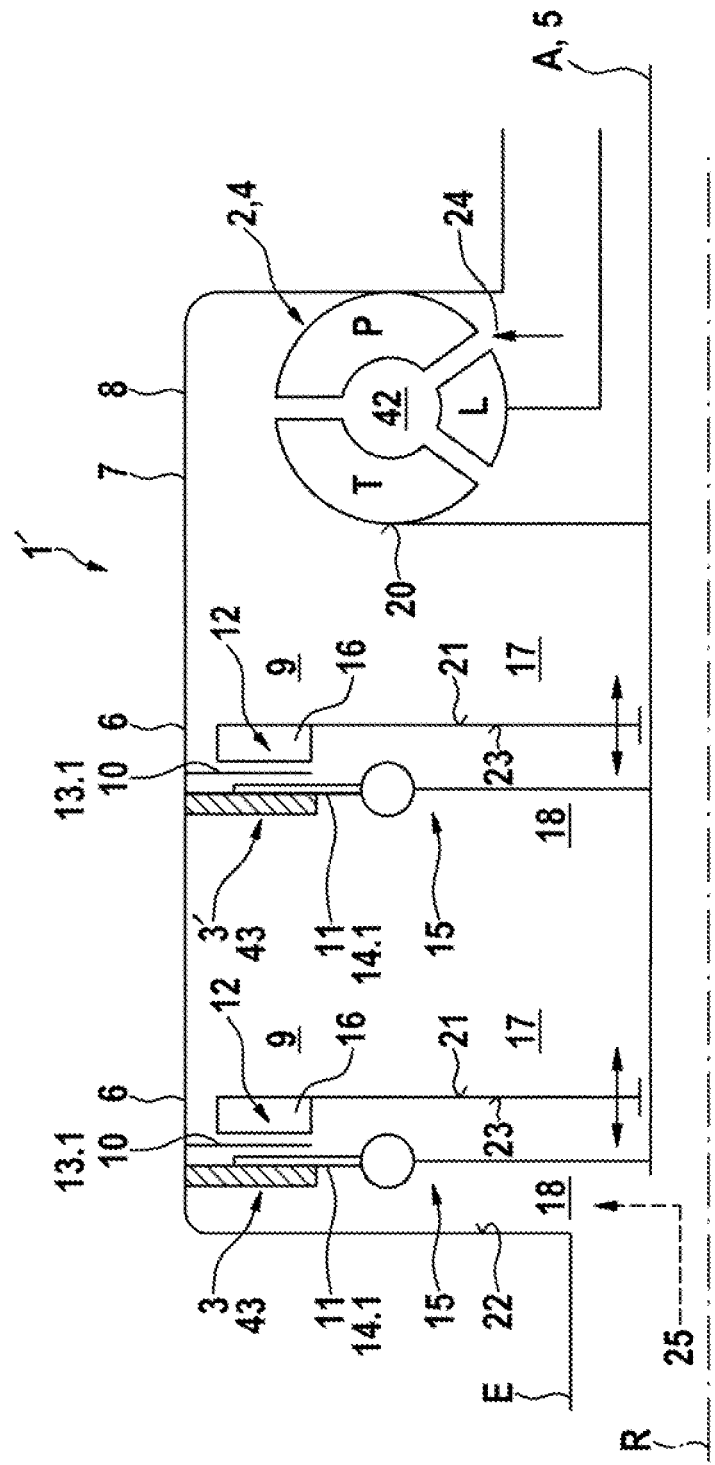

The configuration of the clutch assembly 3 according to the invention is furthermore also suitable for applications in twin clutches with open cooling or in general as a startup clutch. Thus, it is essential that coolant is always provided in the portion of the friction assembly 43. FIG. 13 is a schematic drawing of a force transmission device 1' showing clutch assembly 3' similar to clutch 3 described above. Clutch assembly 3' is mounted coaxially to clutch 3 and comprises components similar, if not identical, to clutch 3. In an alternate embodiment including twin clutch assemblies, one clutch assembly may be mounted concentrically in relation to a second clutch assembly within a force transmission device.

Reference Numerals and Designations
1 force transmission device
1 1' force transmission device
2 hydrodynamic component
3 clutch assembly
3' clutch assembly
4 hydrodynamic speed-/torque converter
5 transmission input shaft
6 housing assembly
7 housing
8 housing shell
9 inner cavity
10 first friction surface assembly
11 second friction surface assembly
12 actuation device
13.1-13.n friction surface bearing elements
15 vibration damper
16 piston element
17 first chamber
18 second chamber 19 connection
20 outer circumference
21 face
22 inner circumference
23 face
24 connection
25 connection
26 connection
27 cooling channels
28 means for generating cooling loop
29 inner circumference
30 coolant loop
30.1, 30.2 coolant loop
31.1-31.n friction liner
32.1, 32.2 face
33 steel disk
34 coolant exchange means
35 pass-through opening
36 pass-through opening
37 outer circumference
38 outer circumference
39 inner circumference
40 groove
41 pass-through opening
42 operating cavity
43 friction assembly
44 pass-through opening
45 slot
46.1 partial element
46.2 partial element
47 channel routing
48.1, 48.2 outer surface
49.1, 49.2 pass-through opening
50 converter cooling loop

The invention claimed is:

1. A clutch assembly, for use in force transmission devices for motor vehicles, comprising:
    a housing assembly filled or fillable with fluid, a friction assembly with a first friction surface assembly and a second friction surface assembly,
    an actuation device for bringing said first and second friction surface assemblies into operative engagement with one another, and,
    means for generating and routing at least one loop of operating fluid repeatedly flowing through one friction surface bearing element of the friction assembly before said operating fluid exits the clutch assembly;
    wherein each of said first and second friction surface assemblies comprises at least one friction surface bearing element, and wherein operating fluid flow for cooling the friction assembly can be generated in the housing assembly;
    wherein the generating and routing means comprises a plurality of cooling channels, said cooling channels defining the routing of a particular loop in flow direction, and whose extension in the desired flow direction from a radially inner portion to a radially outer portion or from a radially outer portion to a radially inner portion, in or at a friction surface bearing element is characterized by a directional component in circumferential direction in rotation direction of the particular friction surface assembly;
    wherein a portion of said plurality of cooling channels are oriented in one direction and the remainder of said plurality of cooling channels are oriented in an opposite direction in respect to the radial direction;
    wherein said means for generating and routing at least one loop of operating fluid includes at least one pass-through channel between a first side of said one friction surface bearing element and a second side of said one friction surface bearing element in the axial direction; and
    wherein said friction surface bearing element is not a clutch piston.

2. A clutch assembly according to claim 1, wherein the particular loop is routed in the friction assembly.

3. A clutch assembly according to claim 2, wherein the particular loop is routed at a friction surface assembly.

4. A clutch assembly according to claim 2, wherein the particular loop is routed through one friction liner of a friction surface assembly.

5. A clutch assembly according to claim 4, wherein the cooling channels disposed for cooling the loop are disposed at the friction liner of a friction surface bearing element of a friction surface assembly.

6. A clutch assembly according to claim 1, wherein at least one cooling channel is configured as a groove fabricated at the surface of the friction surface of the friction surface bearing element.

7. A clutch assembly according to claim 6, wherein at least one cooling channel is configured straight or with flow direction change.

8. A clutch assembly according to claim 6, wherein at least one cooling channel is configured circular arc shaped.

9. A clutch assembly according to claim 6, wherein at least one cooling channel is configured with a cross section area decreasing in flow direction.

10. A clutch assembly according to claim 1, wherein at least one cooling channel extends from the portion of the inner circumference to the outer circumference and vice versa over the friction surface bearing element.

11. A clutch assembly according to claim 1, wherein at least one cooling channel extends from the portion of the inner circumference to the outer circumference or vice versa within the friction surface of the friction surface bearing element.

12. The clutch assembly as recited in claim 1 comprising a force transmission device with an input and output device for use in motor vehicles, the force transmission device including a hydrodynamic component having at least one pump shell and a turbine shell forming in combination at least one operating cavity filled with operating medium;
    wherein the input of the clutch assembly is formed by the input of the force transmission device; and,
    wherein the output of the clutch assembly is formed by the output of the force transmission device.

13. A clutch assembly according to claim 1 wherein said one friction surface bearing element is located on an input side of said clutch assembly.

14. A clutch assembly according to claim 1 wherein said one friction surface bearing element is located on an output side of said clutch assembly.

15. A force transmission device comprising: two clutch assemblies disposed coaxial relative to one another, wherein one of the two clutch assemblies comprises:
    a housing assembly filled or fillable with fluid, a friction assembly with a first friction surface assembly and a second friction surface assembly,
    an actuation device for bringing said first and second friction surface assemblies into operative engagement with one another, and,
    means for generating and routing at least one loop of operating fluid repeatedly flowing through one friction surface bearing element of the friction assembly before said operating fluid exits the clutch assembly;

wherein each of said first and second friction surface assemblies comprises at least one friction surface bearing element, and wherein an operating fluid flow for cooling the friction assembly can be generated in the housing assembly;

wherein the generating and routing means comprises a plurality of cooling channels, said cooling channels defining the routing of a particular loop in flow direction, and whose extension in the desired flow direction from a radially inner portion to a radially outer portion or from a radially outer portion to a radially inner portion, in or at a friction surface bearing element is characterized by a directional component in circumferential direction in rotation direction of the particular friction surface assembly;

wherein a portion of said plurality of cooling channels are oriented in one direction and the remainder of said plurality of cooling channels are oriented in an opposite direction in respect to the radial direction;

wherein said means for generating and routing at least one loop of operating fluid includes at least one pass-through channel between a first side of said one friction surface bearing element and a second side of said one friction surface bearing element; and, wherein said friction surface bearing element is not a clutch piston.

16. A clutch assembly, for use in force transmission devices for motor vehicles, comprising:

a housing assembly filled or fillable with fluid, a friction assembly with a first friction surface assembly and a second friction surface assembly, an actuation device for bringing said first and second friction surface assemblies into operative engagement with one another, and, means for generating and routing at least one loop of operating fluid repeatedly flowing through one friction surface bearing element of the friction assembly before said operating fluid exits the clutch assembly;

wherein each of said first and second friction surface assemblies comprises at least one friction surface bearing element, and wherein operating fluid flow for cooling the friction assembly can be generated in the housing assembly;

wherein the generating and routing means comprises a plurality of cooling channels, said cooling channels defining the routing of a particular loop in flow direction, and whose extension in the desired flow direction from a radially inner portion to a radially outer portion or from a radially outer portion to a radially inner portion, in or at a friction surface bearing element is characterized by a directional component in circumferential direction in rotation direction of the particular friction surface assembly;

wherein a portion of said plurality of cooling channels are oriented in one direction and the remainder of said plurality of cooling channels are oriented in an opposite direction in respect to the radial direction; and, wherein a first portion of the loop is routed through a friction surface bearing element of a friction surface assembly, and the return routing is provided outside of the friction surface assembly.

17. A clutch assembly according to claim 16, wherein a second portion of the cooling loop is routed in the housing assembly.

18. A clutch assembly according to claim 16, wherein the friction surface assembly bearing the cooling channels is connected to an input of the clutch assembly.

* * * * *